Aug. 16, 1966 W. A. SCHULZE ETAL 3,266,244
LIQUID-FUELED ROCKET ROLL CONTROL DEVICE
Filed Jan. 28, 1963 2 Sheets-Sheet 1

William A. Schulze
Herbert W. Fuhrmann,
INVENTORS.

BY Edward J. Kelly
Herbert Berl
Jack W. Voigt

Aug. 16, 1966  W. A. SCHULZE ETAL  3,266,244
LIQUID-FUELED ROCKET ROLL CONTROL DEVICE
Filed Jan. 28, 1963  2 Sheets-Sheet 2

William A. Schulze
Herbert W. Fuhrmann,
INVENTORS.

United States Patent Office 3,266,244
Patented August 16, 1966

3,266,244
LIQUID-FUELED ROCKET ROLL
CONTROL DEVICE
William A. Schulze, 1303 Hermitage Ave. SE., and
Herbert W. Fuhrmann, 207 Marsheutz Ave. SW.,
both of Huntsville, Ala.
Filed Jan. 28, 1963, Ser. No. 254,514
3 Claims. (Cl. 60—35.55)

The invention described herein may be manufactured and used by or for the Government for governmental purposes without the payment of any royalty thereon.

This invention relates to a roll control system and, more particularly, to a roll control system for use with a missile. The device utilizes turbine exhaust gas formerly not utilized, and a directional, selectively movable, exit nozzle to change the direction of thrust and effectively alter the attitude of flight or roll of a missile or similar craft.

Prior means, for altering the direction of flight or roll in missiles, used an independent fluid pressure system exhausted to the atmosphere through a fixed nozzle. Two obvious disadvantages of this system are: it provides only one direction of thrust, and requires a separate fluid pressure system solely for providing this thrust.

In many liquid fuel missile systems, fuel and oxidizers are forced under pressure into the combustion chamber by means of a turbine-driven pump with the turbine being driven by gas generated within the missile. This gas is generated through a chemical process such as the decomposition of $H_2O_2$ into super heated steam and oxygen. The present invention provides roll control by utilizing this source of gas pressure, already inherent to the missile system, by releasing this gas through a controlled nozzle exterior to the craft, thus providing effective control of the craft without addition of a second gas pressure system.

An object of the present invention is to reduce the size and weight of present missile systems by utilizing the turbine exhaust gases for control purposes, thus eliminating need for a separate source of gas pressure.

Another object of the present invention is to provide an adjustable, roll control nozzle for changing the direction of thrust.

A further object of this invention is to provide a roll control system adaptable to nozzle assemblies for varied control requirements and uses.

Still a further object of this invention is to provide an effective roll control device which is simple and inexpensive in construction yet reliable in operation.

The foregoing and other objects of this invention will become more fully apparent from the following description taken in conjunction with the accompanying drawings in which.

Figure 1:
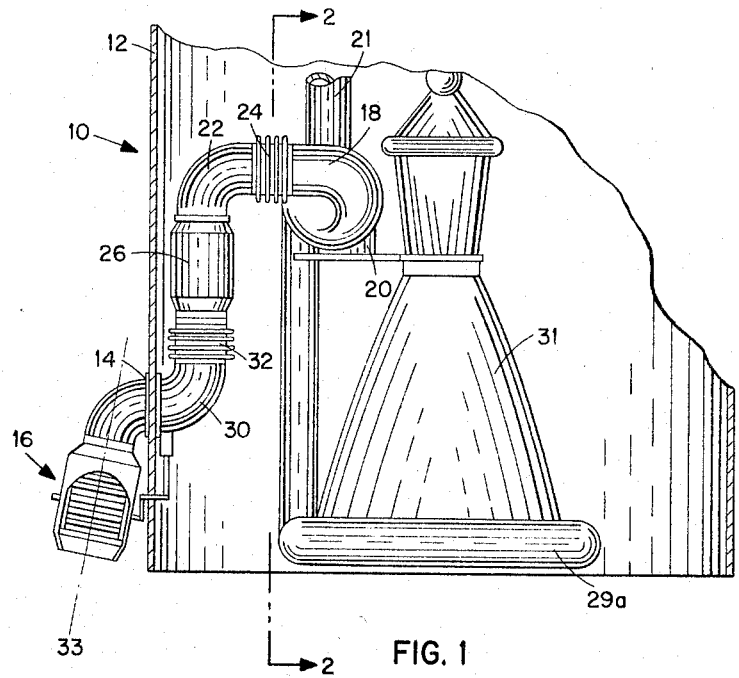
FIGURE 1 is a cut away assembly view showing the present invention in relation to the missile body, the turbine, and the main missile engine.

As shown in FIGURE 1, the exhaust gas from turbine 20, which drives a fuel pump 25 (FIGURE 2), is directed through a hollow interior conduit generally indicated by reference numeral 10, to wall 12 of the missile. Wall 12 is provided with an opening at a joint 14 to allow unobstructed continuous flow of gas through wall 12 and into an exteriorly mounted discharge nozzle 16.

Conduit 10 comprises two elbow sections 22 and 30 with a heat exchanger 26 interposed therebetween. Section 22 is connected to the exhaust section 18 of turbine 20 by a vibration eliminating coupling 24. A similar vibration eliminating coupling 32 connects heat exchanger 26 to section 30. Discharge nozzle 16 is connected to section 30 of conduit 10 by joint 14 at missile wall 12. The function of heat exchanger 26 is to heat cryogenics, such as liquid oxygen passed therethrough, thereby vaporizing the oxygen which may be utilized for applying gaseous pressure to the fuel tanks or other missile systems.

Figure 2:
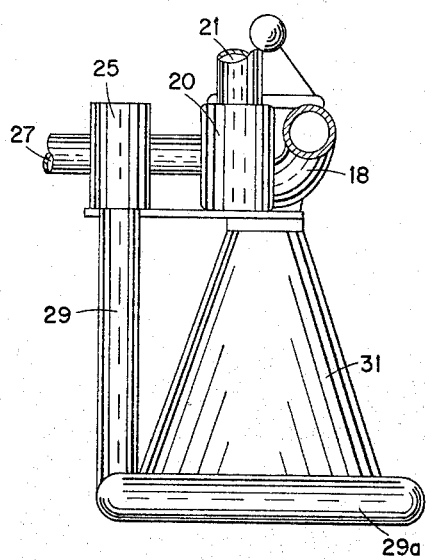
FIGURE 2 is a sectional view of the present invention taken on line 2—2 of FIGURE 1.

As shown in FIGURE 2, turbine 20 includes an inlet 21, connected to a steam source (not shown) within the missile, and an exhaust section 18 which exhausts gases into duct 10. The turbine drives a pump 25 which includes an inlet 27 and an outlet 29. Outlet 29 of pump 25 is connected to a circular manifold 29a about the exit portion of the nozzle affixed to main motor 31. Fuel is pumped through this manfold and through passageways in the nozzle wall (not shown) to cool the engine.

The disposition of discharge nozzle 16 with respect to the missile body is such that its axis, represented by line 33 (FIGURE 1), passes through the center of gravity of the missile when the nozzle is in its nondeflected or neutral position, thus the thrust of nozzle 16 does not introduce any yaw to the missile. As the propellants in the missile are expended during flight, the center of gravity will change slightly. The slight misalignment of the nozzle under this condition is compensated for by the gimbal action of the main motor. Roll control systems, utilizing two or more nozzles at equally spaced points on the periphery of the missile, may also be used. Since these nozzles would automatically compensate each other, the need for compensation by the main motor would be eliminated.

Figure 4:
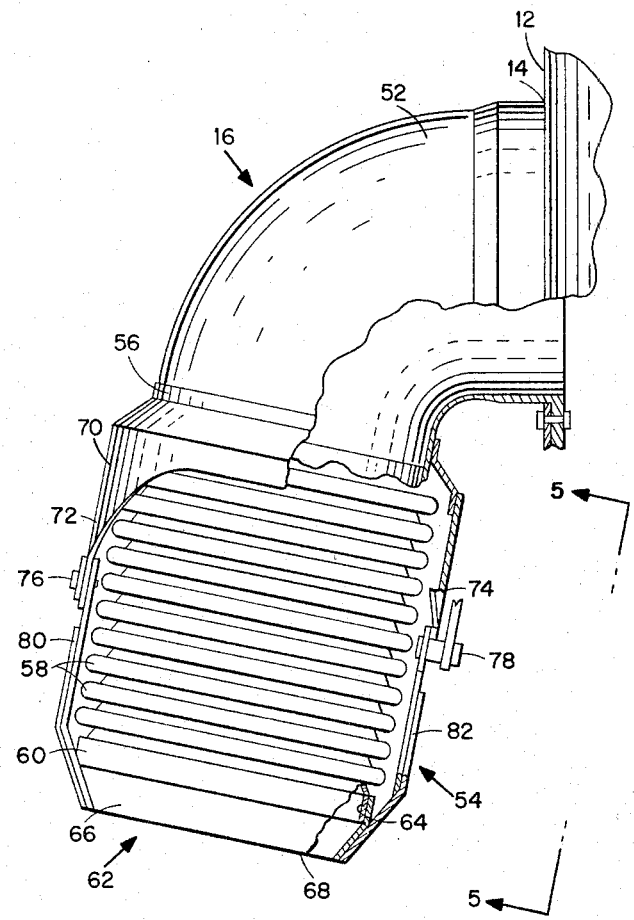
FIGURE 4 is an elevation view partly cut away showing one embodiment of the nozzle used with the present invention.

FIGURE 4 illustrates nozzle 16 having a tubular conduit 52 rigidly affixed to missile wall 12 at joint 14 in communication with conduit 10. To permit directional movement of nozzle 16, a flexible section 54 is affixed to the distal end 56 of conduit 52. Section 54 comprises a plurality of ribbed sections 58 interconnected to form a continuous flexible (airtight) hollow duct with conduit 52. Affixed to a lower most portion 60 of section 54 is an annular non-flexible tip 62. Tip 62 consists of a cylindrical portion 64 affixed to the flexible section 54 and a tapered conical portion 66 tapered rearwardly and inwardly from portion 64 to form a discharge end 68 of nozzle 16.

Conduit 52 is provided at its lower end 56 with a circumferentially mounted rearward projecting bracket 70. Bracket 70 is pivotally connected by a pair of flanges 72 and 74, respectively, at pivot points 76 and 78, to a pair of brackets 80 and 82, which are affixed to, and project forwardly from tip 62 as shown in FIGURE 4.

Figure 5:
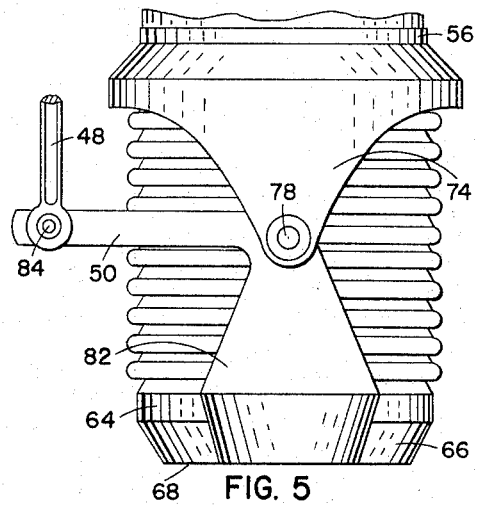
FIGURE 5 is a fragmentary elevation view taken about line 5—5 of FIGURE 4.

Bracket 82 includes an arm 50 (FIGURE 5) projecting from pivot point 78 in a direction substantially normal to the longitudinal axis of section 54 of nozzle 16.

Figure 3:
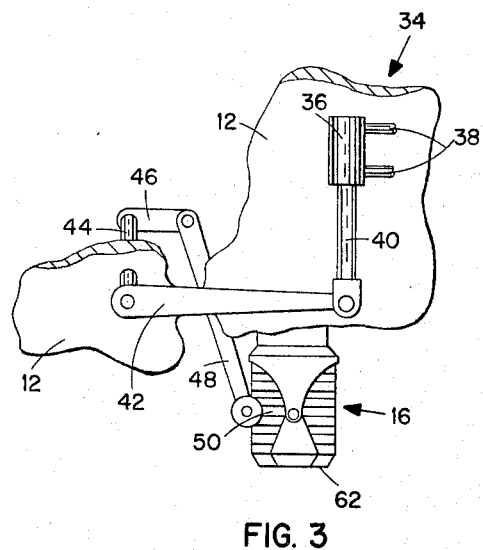
FIGURE 3 is a perspective view of the control linkage for moving the nozzle of the present invention.

Directional control of tip 62 is provided by a nozzle actuating assembly 34, FIGURE 3, which comprises a double acting hydraulic cylinder 36 connected to two conduits 38. A rod 40 is connected at one of its ends to a piston slideably mounted in cylinder 36. A control arm 42 is pivotally connected to the other end of rod 40. Arm 42 is fixed to shaft 44 journaled to, and extending through, missile wall 12. A second control arm 46 is firmly affixed to an outer end of shaft 44, and a rod 48 connects arm 46 to control arm 50 fixed to tip portion 62 of nozzle 16.

Rod 40 is hydraulically actuated by the piston in cylinder 36, thereby transmitting motion through arm 42, shaft 44, arm 46 and rod 48. Ultimately, through this linkage, motion is transmitted to lever arm 50, which is rigidly affixed to nozzle tip 62, thereby affecting controlled deflection of nozzle 16.

The flexible nozzle of the present invention thus far described provides nozzle deflection up to substantially ±24 degrees each way from neutral.

It is to be understood that various modifications of the roll control system described herein can be made without changing the spirit and scope of the invention as claimed.

We claim:

1. A roll control device for use in a liquid fueled rocket wherein a turbine is used to drive the rocket's fuel pumps comprising a hollow exhaust duct system for said turbine, said duct system being connected to the turbine exhaust and to the external wall of the rocket, an exit nozzle including a flexible tubular section having a plurality of interconnected ribbed sections, said nozzle having one end thereof secured to said duct system in fluid communication with said turbine exhaust and its other end open to the atmosphere, said tubular section being provided at opposite ends thereof with a pair of flanged elements, each of said flanged elements having a pair of arm members disposed on diametrically opposite sides of said tubular section, said arm members of the first of said flanged elements extending therefrom to a point intermediate said pair of flanged elements, said arm members of the second of said flanged elements extending therefrom to said intermediate point for pivotal connection to said arm members of the first of said flanged members, said pivotal connection comprising a shaft fixed to one of the arms extending from the flanged element on the end of the tubular section which is open to atmosphere, said shaft being rotatable within an aperture in the corresponding arm in the pair of arm members extending from the flanged element on the end of the tubular section which is secured to said duct system, and means connected to said shaft for adjusting the position of said nozzle to control the direction of gas flow from said nozzle to the atmosphere.

2. A roll control device as set forth in claim 1, wherein the axis of said exhaust nozzle passes through the center of gravity of the missile when the nozzle is in its neutral position.

3. A roll control device as set forth in claim 1 wherein said means connected to said shaft for adjusting the position of said nozzle includes an arm extending from said nozzle, a double acting piston cylinder having a piston slidably mounted therein, and a rod connected to said piston and said arm for transmitting movement to said nozzle.

References Cited by the Examiner

UNITED STATES PATENTS

| 167,505 | 9/1875 | Crawford. | |
|---|---|---|---|
| 2,503,271 | 4/1950 | Hickman | 102—49 |
| 2,537,487 | 1/1951 | Stone | 60—35.55 |
| 2,947,500 | 8/1960 | Dreyer et al. | 60—35.54 X |
| 3,064,420 | 11/1962 | Goehler | 60—35.55 |

FOREIGN PATENTS

| 1,080,862 | 4/1960 | Germany. |
|---|---|---|
| 1,087,909 | 8/1960 | Germany. |

OTHER REFERENCES

Sutton, G. P.: Rocket Propulsion Elements, 1956, pp. 279 and 280., New York, John Wiley and Sons.

Stehling, K. R.: Vernier engines. In Space/Aeronautics, pp. 49–51, August 1960.

MARK NEWMAN, *Primary Examiner.*

SAMUEL LEVINE, *Examiner.*

T. BLUMENSTOCK, R. D. BLAKESLEE,
*Assistant Examiners.*